United States Patent
Song et al.

(10) Patent No.: US 10,818,015 B2
(45) Date of Patent: Oct. 27, 2020

(54) AUTOMATIC REGION OF INTEREST SELECTION IN CENTROSOME ANALYSIS

(71) Applicant: Florida Analytical Imaging Solutions, LLC., Palm Harbor, FL (US)

(72) Inventors: Dansheng Song, Tampa, FL (US); Tatyana A. Zhukov, Palm Harbor, FL (US); Victoria Link, Columbia, MD (US)

(73) Assignee: Florida Analytical Imaging Solutions, LLC., Palm Harbor, FL (US)

( * ) Notice: Subject to any disclaimer, the term of this patent is extended or adjusted under 35 U.S.C. 154(b) by 103 days.

(21) Appl. No.: 16/258,973

(22) Filed: Jan. 28, 2019

(65) Prior Publication Data

US 2020/0242772 A1 Jul. 30, 2020

(51) Int. Cl.
| | |
|---|---|
| G06T 7/11 | (2017.01) |
| G06T 7/136 | (2017.01) |
| G06T 5/00 | (2006.01) |
| G06T 5/30 | (2006.01) |
| G06T 5/50 | (2006.01) |
| G06T 7/00 | (2017.01) |
| G06T 5/10 | (2006.01) |
| G06T 7/155 | (2017.01) |

(52) U.S. Cl.
CPC ............ *G06T 7/11* (2017.01); *G06T 5/002* (2013.01); *G06T 5/30* (2013.01); *G06T 5/50* (2013.01); *G06T 7/0012* (2013.01); *G06T 7/136* (2017.01); G06T 2207/10024 (2013.01); G06T 2207/20221 (2013.01); G06T 2207/30096 (2013.01)

(58) Field of Classification Search
None
See application file for complete search history.

(56) References Cited

U.S. PATENT DOCUMENTS

| | | | |
|---|---|---|---|
| 5,972,626 A | 10/1999 | Doxsey | |
| 8,737,715 B2 | 5/2014 | Zhukov et al. | |
| 9,552,649 B2 | 1/2017 | Banerjee et al. | |
| 9,589,100 B2 | 3/2017 | Aneja et al. | |
| 10,049,770 B2 | 8/2018 | Madabhushi et al. | |
| 10,055,840 B2 | 8/2018 | Chukka et al. | |
| 2002/0154798 A1* | 10/2002 | Cong | G06K 9/0014 382/128 |
| 2004/0115697 A1 | 6/2004 | Doxsey et al. | |
| 2005/0266395 A1* | 12/2005 | Gholap | G06K 9/48 435/4 |
| 2008/0005703 A1* | 1/2008 | Radivojevic | G06F 3/011 715/863 |
| 2014/0205173 A1* | 7/2014 | Padfield | G06K 9/00127 382/133 |
| 2015/0278575 A1* | 10/2015 | Allano | G06T 7/12 382/133 |
| 2016/0260224 A1 | 9/2016 | Ward et al. | |

(Continued)

*Primary Examiner* — Mohammed Rachedine
(74) *Attorney, Agent, or Firm* — Maier & Maier, PLLC

(57) ABSTRACT

A method and system for selecting a region of interest (ROI) in a tissue or groups of cells, in which one or more of the steps can be automated. In various exemplary embodiments, the method and system can be fully-automated. In various exemplary embodiments, the method and system can be applied to centrosome analysis with excellent accuracy and precision. Centrosome analysis is an important tool in very early cancer diagnosis and cancer prognosis.

16 Claims, 14 Drawing Sheets
(8 of 14 Drawing Sheet(s) Filed in Color)

(56) References Cited

U.S. PATENT DOCUMENTS

2018/0349722 A1\* 12/2018 Chiang .................... G06K 9/48
2019/0042826 A1\* 2/2019 Chang .................. G06K 9/4638
2020/0131583 A1\* 4/2020 Glazko ................ C12Q 1/6883

\* cited by examiner

AUTOMATIC REGION OF INTEREST SELECTION IN CENTROSOME ANALYSIS

FIELD

The present disclosure relates generally to medical imaging methods and systems. More specifically the disclosure relates to methods and systems for selecting a region of interest (ROI) for analysis of a biological sample. In particular, the disclosure relates to fully automated methods and systems for selecting ROIs from tissue and cell samples in centrosome analysis for early cancer diagnosis.

BACKGROUND

The centrosome is a small organelle located near the nucleus that serves as the main microtubule organizing center of the animal cell as well as a regulator of cell-cycle progression. Centrosomes are composed of two centrioles arranged at right-angles to each other, and surrounded by an amorphous mass of protein termed the pericentriolar matrix (PCM). The PCM contains proteins responsible for microtubule nucleation and anchoring including γ-tubulin, pericentrin and ninein.

Centrosome abnormalities have been described in many types of cancer cells, such as lung cancer, breast cancer, prostate cancer, pancreatic cancer and leukemia. The two main types of alterations are structural and numeric aberrations. Centrosome defects have been found to occur at a very early premalignant stage of tumor formation, prior to the appearance of detectable lesions. Therefore cancer can be detected at a very earlier stage via detection of centrosome defects.

Centrosome analysis can be performed by staining the cells or tissue, scanning with a high resolution microscope to acquire high quality images, processing the images, extracting features from the centrosomes, and analyzing the features to obtain a diagnosis result. The region of interest (ROI) selection is an important part of image processing in centrosome analysis. Centrosome features can be extracted from the ROI, or centrosomes from a ROI can be inputted into a deep learning neural network for classification.

ROI selection is commonly used in medical image processing. ROI has been carried out manually at medical centers for many years; indeed this method is still in use. Manual ROI selection is time inefficient, and therefor economically inefficient. Manual ROI selection is also subjective and suffers from a lack of consistency. Because of this, efforts have been undertaken to develop fully-automated ROI selection procedures.

SUMMARY

The present disclosure describes a method and system for selecting a region of interest (ROI) in a tissue or groups of cells, in which one or more of the steps can be automated. In various exemplary embodiments, the method and system can be fully-automated. In various exemplary embodiments, the method and system can be applied to centrosome analysis with excellent accuracy and precision. Centrosome analysis is an important tool in very early cancer diagnosis and cancer prognosis.

According to various exemplary embodiments, the ROI selection process divides a frame image into smaller images. Each of the smaller images is the ROI and includes only one cell and the centrosomes belonging to that cell. According to various exemplary embodiments, high resolution images of cells are acquired and then followed up with one or more image preprocessing and processing steps to remove noise and background, segment the nuclei, divide the cells, and clean, crop and output the individual ROIs. Working on a smaller and simpler ROI image, which only includes one cell and its centrosomes, can be much easier than working on a larger and more complicated frame image with many cells, centrosomes and noise.

An exemplary embodiment of the presently disclosed method and system can be summarized by the flow chart shown in FIG. 1. According to this fully-automated exemplary embodiment, a frame image is analyzed, the nuclei are segmented and separated, and boundaries are drawn between the cells to divide the cells. Some of the cell boundaries may be found to lie across one or more of the centrosomes, which could negatively affect centrosome analysis. Accordingly, the cell boundaries may be corrected to avoid the centrosomes. The centrosomes can also be subjected to steps of denoising and background removal and then segmented. After these corrections, all of the cells and centrosomes can be appropriately divided. Additional steps of cleaning and cropping the individual cells (ROI) can also be performed, and the ROI can be output.

The present method has clinical utility and has broad application across a range of cell types and tissue sources, and can be used: (i) to better inform clinicians about the risk associated with a tumor and therefore, the best course of therapy; (ii) to improve treatment outcomes and ultimately patient survival; and (iii) provide a basis for improved treatment of cancer.

In the following detailed description, reference is made to the accompanying drawings, which are incorporated in and constitute a part of the specification. The drawings, together with the detailed description of the embodiments given below, serve to explain the principles by which the methods and systems may be practiced. It is to be understood that other embodiments may be utilized and structural changes may be made without departing from the scope of the present disclosure.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 2A is a color cell culture image of Untreated A549 Lung adenocarcinoma cells, labeled with γ-tubulin antibody and a secondary antibody conjugated to a red fluorescent label, in which the centrosomes appear as red spots. The nuclei were stained with DAPI, which is revealed by the blue image. The cells show abnormal structure of centrosomes, with amplification, elongation, and fragmentation. FIG. 2B is a grayscale image taken from the original color image of FIG. 2A. It only includes the nuclei of the cells. FIG. 2C is the grayscale image after gradient segmentation to produce the contours of the nuclei. FIG. 2D is the grayscale image after constrained dilation, showing the well preserved nuclei.

FIG. 3A is a binary image of nuclei obtained after multilevel Otsu thresholding of the grayscale image of FIG. 2D. FIG. 3B is the image after five times peeling, in which the connection between objects (nuclei) are slimmed. FIG. 3C is a Euclidian distance transformed image of FIG. 3B. FIG. 3D is the image after direct watershed transformation, in which the nuclei are shown to be over-segmented.

FIG. 4A shows the image after filtering out tiny local minima so that only one minima remains for every nucleus (white spots in the middle of the nuclei). These minima have overlapped on the binary image of FIG. 3B. FIG. 4B shows the image of FIG. 4A after improved watershed segmentation, most connected nuclei (indicated by red arrows) are separated correctly. FIG. 4C shows the image of FIG. 4B after shrinking the image, with the nuclei being further separated.

FIG. 4D shows the original color image from FIG. 2A, with the cell boundaries. Cells are successfully separated, but some centrosome (red dots) are cut by the boundaries, which could negatively affect centrosome analysis.

FIG. 5A represents the surface of a centrosome from the original grayscale image. FIG. 5B represents the surface after denoising and background removal after undergoing processing steps according to an exemplary embodiment of the present disclosure.

FIG. 7A represents the surface of the original centrosome image. FIG. 7B represents the centrosome image after undergoing background cleaning and denoising processing steps according to an exemplary embodiment of the present disclosure.

FIG. 8A is the original centrosome image before background cleaning. FIG. 8B is the centrosome image after undergoing background cleaning and denoising processing steps according to an exemplary embodiment of the present disclosure.

In FIG. 12A, the segmented centrosomes on boundaries have been dilated to form a centrosome mask, which include centrosomes but bigger than centrosomes. In FIG. 12B the interior pixels of these mask have been removed to create centrosome boundaries. In FIG. 12C new boundaries have been formed in which the centrosomes falling on the boundaries have been merged into the closest cell area. In FIG. 12D the new boundaries have been added into the original color image (FIG. 2A). The new boundaries avoid all centromeres.

In FIG. 13A, a bounding-box of an individual cell is produced from a cell area mask image like FIG. 12C. As shown in FIG. 13A, the bounding-box may include parts of other cells, which may affect processing. In FIG. 13 B, to exclude the parts of other cells, one cell mask is turned on (pixel value 1) and all other cell masks are turned off (pixel value 0).

In FIG. 14A, the bounding-box is a circumscribed rectangle of a cell area. The coordinates of a corner of the rectangle and its length and width are obtained, and the ROI mask image is cut off, based on the bounding box. Then, in FIG. 14B, a ROI from the original color image (FIG. 2A) is cut off based on the ROI mask. In FIG. 14C, the nucleus is segmented to obtain the nucleus' mask, and in FIG. 14D, the nucleus' mask is cleaned. FIG. 14E shows the difference in the nucleus mask before cleaning and after cleaning.

DETAILED DESCRIPTION

Figure 1:
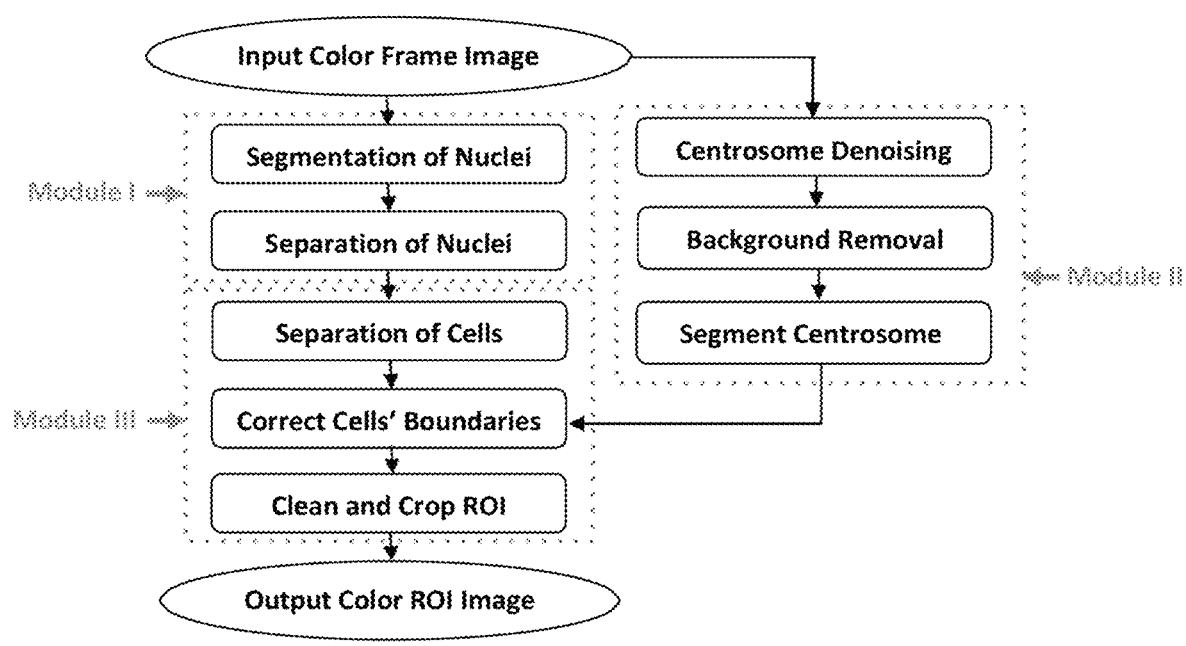
FIG. 1 is a flow chart of a method for region of interest (ROI) selection in centrosome analysis according to an exemplary embodiment of the present disclosure.

An exemplary embodiment of the presently disclosed method and system is described by the flow chart shown in FIG. 1. The method and system described in FIG. 1 is only an illustrative embodiment, and other embodiments of such a method and system can include more, fewer, or different steps. Or the steps shown may be differently arranged. In various exemplary embodiments, one or more steps are performed by one or more suitably programmed computers. In a particular embodiment, all of the method steps are performed by the one or more suitably programmed computers. Computer-executable instructions for performing these steps can be embodied on one or more computer-readable media.

As one skilled in the art will appreciate, embodiments of the present disclosure can be embodied as, among other things: a method, system, or computer-program product. Accordingly, the embodiments can take the form of a hardware embodiment, a software embodiment, or an embodiment combining software and hardware. An exemplary embodiment takes the form of a computer-program product that includes computer-useable instructions embodied on one or more computer-readable media. Methods, data structures, interfaces, and other aspects of the methods and systems described herein can be embodied in such a computer-program product.

Figure 2A:
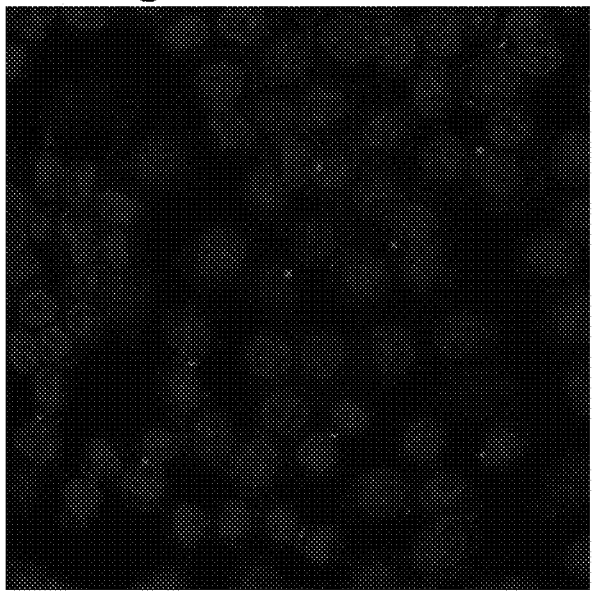
FIGS. 2A to 2D display photomicrographs of a cell culture image.

According to an exemplary embodiment, a color frame image is input, as shown in FIG. 2A. The image can be obtained from a biological specimen, such as a tissue sample containing multiple cells or from a collection of individual cells. The tissue can be from any human tissue, e.g., bladder, brain, breast, colon, connective tissue, esophagus, kidney, lung, lymph node, ovary, prostate, skin, stomach, testis and uterus. The tissue sample can be fresh, such as a biopsy sample, or can be from an archived sample, such as a frozen sample or a sample embedded in paraffin. Samples can also be processed by tissue isolation and dissociation steps to release individual cells.

A variety of biopsy techniques may be used to obtain a cell or tissue sample such as excisional (i.e., removal of an entire lesion) or incisional (i.e., where a portion or wedge of tissue is removed). In some cases, a fine-needle may be required to withdraw cellular material from a tissue mass using aspiration techniques (e.g., aspiration biopsy). Further, cell or tissue samples may be cells isolated from any cell suspension, body fluid samples, or cells dislodged from tumor by any other means.

According to various exemplary embodiments, normal and/or cancer tissue samples can be formalin-fixed paraffin-embedded or may be fresh-frozen in an OCT compound (such compounds are well-known in the art) and sectioned or fixed with methanol or any other appropriate fixative (such fixatives, processes and types are well-known in the art). According to various exemplary embodiments, cell samples may be stained with one or more antibodies, biologically active fragments thereof, and/or binding agents directed against pericentriolar matrix components. In an exemplary embodiment, the primary antibody or binding agent specifically binds an antigen, protein or component of the PCM that shows substantial localization to centrosomes at all stages of the cell cycle.

In some exemplary embodiments, the primary antibody or binding agent is conjugated to a fluorophore or quantum dot to facilitate visualization of signal. In other exemplary embodiments, a secondary antibody or binding agent that binds to the primary antibody or binding agent is used to facilitate visualization. A variety of such secondary antibodies are known in the art.

In various exemplary embodiments, the sample can be fixed and then contacted with a centrosome detecting antibody under conditions that permit binding of the antibody to a centrosomal antigen in the cells, and then detecting the antibody bound to the centrosomal antigen. The centrosomal antigen can be a protein present in centrosomes, e.g., γ-tubulin, pericentrin, centromere protein J, and ninein. Antibodies that react with centrosomal proteins are known in the art. The antibody can be detected by means of a label, such as a fluorophore, which can be attached to the centrosome detecting antibody or attached to a secondary antibody.

In various exemplary embodiments, antibodies, binding agents or stains targeted to the nucleus of a cell are utilized. Although not so limited, this may be a fluorescent protein-based marker for the nucleus. Exemplary nuclear markers include, but are not limited to, nuclear counterstains for live cells and unfixed tissues, nucleic acid stains, 4',6-diamindino-2-phenylindole (DAPI), Hoechst stains and propidium iodide.

In an exemplary embodiment, a suitable primary antibody for use is a monoclonal anti-γ-tubulin antibody produced in mouse (Sigma Aldrich), a suitable secondary antibody for use is the Alexa Fluor 488 Goat Anti-Mouse IgG (H+L) Antibody (Life Technologies), and nuclei can be stained using DAPI (Sigma Aldrich).

According to various exemplary embodiments, useable images can be acquired using various techniques and equipment. Centrosomes and nuclei may be visualized using any form of microscopy suitable for facilitating three dimensional visualization of centrosomes and nuclei. Exemplary microscopic methodologies include, but are not limited to, confocal laser scanning microscopy, spinning-disk confocal microscopy, confocal X-ray fluorescence imaging, electron microscopy, electron microscope tomography, IHC, 3D-SIM and the like. In an exemplary embodiment, a confocal microscope can be used to image the cells, for instance under an oil immersion objective.

According to various exemplary embodiments, the color frame image can be obtained from an imaging system. The imaging system may include a camera on a microscope or a whole-slide scanner having a microscope and/or imaging components. According to various exemplary embodiments, an imaging system can be used to digitize or scan whole-slide images corresponding to serial sections of a tissue sample from a human patient.

According to various exemplary embodiments, digitized images of whole-slides may be provided via a network or any other communication means. According to various exemplary embodiments, a digitized image, for example a whole-slide, can be saved in a memory or storage device, such as a local image folder or a remote image server, and is opened and/or imported from the memory or storage device.

I. Segmentation of Nuclei

Figure 2B:
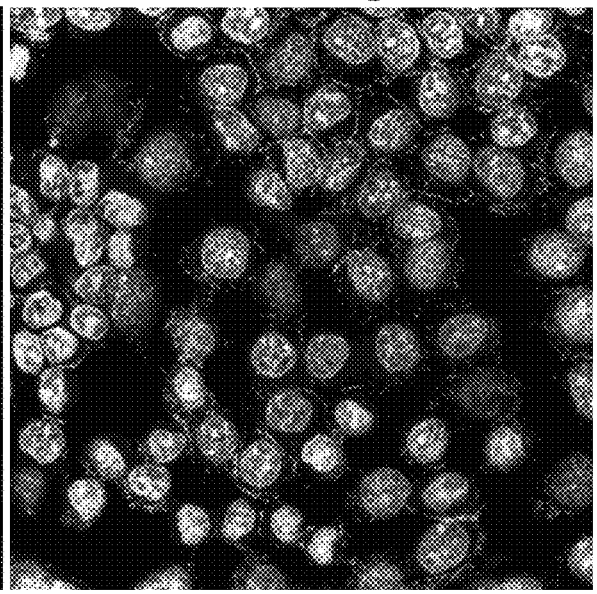

According to various exemplary embodiments, a color frame image is input, as shown in FIG. 2A. According to an exemplary embodiment, the color frame image is converted into a grayscale image, as shown in FIG. 2B. A gradient magnitude process can then be used as a segmentation function to delineate the contours and areas of the nuclei. In this embodiment, the gradient of a two-variable function (the image intensity function) at each image point is a 2D vector with the components given by the derivatives in the horizontal and vertical directions. At each image point, the gradient vector points in the direction of largest possible intensity increase, and the length of the gradient vector corresponds to the rate of change in that direction.

In this manner, the gradient of an image is a vector of its partials. The gradient of an image (I) is $$\nabla I = \begin{bmatrix} g_x \\ g_y \end{bmatrix} = \begin{bmatrix} \frac{\partial I}{\partial x} \\ \frac{\partial I}{\partial y} \end{bmatrix}$$

where:

$$\frac{\partial I}{\partial x}$$

is the derivative with respect to x (the gradient in the x direction), $$\frac{\partial I}{\partial y}$$

is the derivative with respect to y (the gradient in the y direction).

Figure 2C:
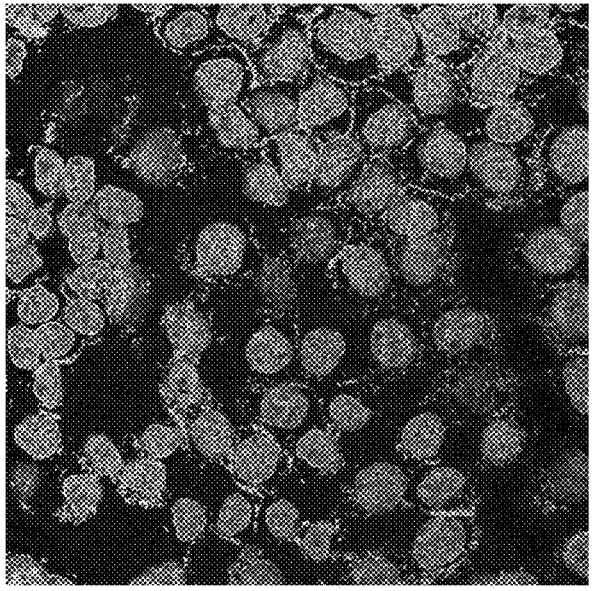

The gradient magnitude is given by $M=\sqrt{g_x^2+g_y^2}$. This calculation is applied on every pixel of the image. In an exemplary embodiment, the applied gradient magnitude process can produce an image like that shown in FIG. 2C.

According to various exemplary embodiments, morphological operations can be applied to the image. These image processing operations can process images based on shapes. Morphological operations apply a structuring element to an output image, creating an output image of the same size. In a morphological operation, the value of each pixel in the output image is based on a comparison of the corresponding pixel in the input image with its neighbors. By choosing the size and shape of the neighborhood, a morphological operation can be constructed that is sensitive to specific shapes in the input image.

According to various exemplary embodiments, one or more morphological operations can be applied to the image. In an exemplary embodiment, dilation and erosion are two morphological operations that can be performed. Dilation adds pixels to the boundaries of objects in an image, while erosion removes pixels on object boundaries. The number of pixels added or removed from the objects in an image can depend on the size and shape of the structuring element used to process the image.

In the morphological dilation and erosion operations, the state of any given pixel in the output image is determined by applying a rule to the corresponding pixel and its neighbors in the input range. According to various exemplary embodiments, the rule used to process the pixels defines the operation as a dilation or an erosion. In a dilation, the value of the output pixel is the maximum value of all the pixels in the input pixel's neighborhood. In various exemplary embodiments, erosion and dilation operations can also be used in processing pixels at image borders (padding).

Figure 2D:
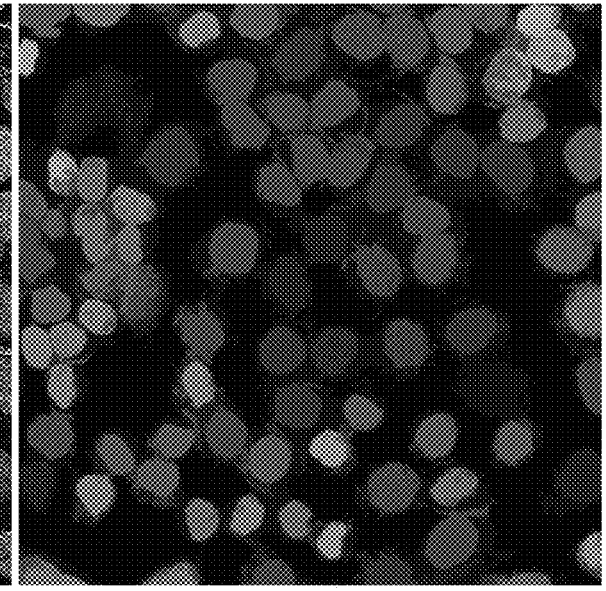

According to various exemplary embodiments, erosion can be used to remove low levels of noise from the image, followed by constrained repeated dilations. The dilations are constrained by the original gray nuclei image (FIG. 2B). This helps to raise some of the low intensity areas while clipping short peaks that are higher than the original gray nuclei image. This produces a kind of smoothing effect that is restrained in the target areas. After this morphological reconstruction, the areas of nuclei can be quite well preserved, as shown in FIG. 2D.

Figure 3A:
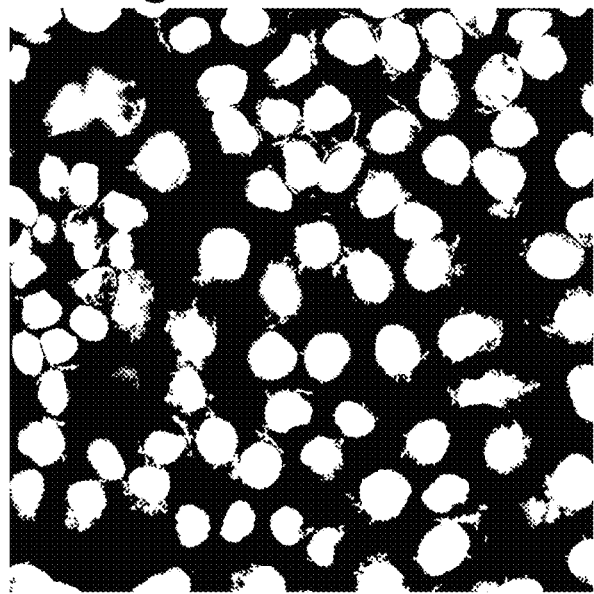
FIGS. 3A to 3D display photomicrographs of the original color image shown in FIG. 2A, after undergoing further image processing steps according to an exemplary embodiment of the present disclosure.

According to various exemplary embodiments, a thresholding process can be used to create a binary image from a grayscale image. In various exemplary embodiments, the reconstructed grayscale image exemplified in FIG. 2D can be segmented with clustering-based image thresholding, for example an Otsu threshold method, to reduce the grayscale image to a binary image. According to various exemplary embodiments, a multilevel Otsu threshold can be used to obtain a binary image of the segmented nuclei. FIG. 3A shows the segmented nuclei binary image after applying a multilevel Otsu threshold algorithm.

The multilevel Otsu threshold segmentation algorithm was developed from a single-level Otsu threshold segmentation algorithm. The single-level Otsu threshold segmentation algorithm finds an optimized threshold to divide all pixels in an image into two classes that minimize the inner class variance and maximize variance between the two classes. The Otsu method exhaustively searches for the threshold that minimizes the inner class variance (the variance within the class), defined as a weighted sum of variances of the two classes:

$$\sigma_w^2(t)=q_1(t)\sigma_1^2(t)+q_2(t)\sigma_2^2(t)$$

where $\sigma_1^2(t)$ and $\sigma_2^2(t)$ are variances of these two classes:

$$\sigma_1^2(t) = \sum_{i=1}^{i} [i-\mu_1(t)]^2 \frac{P(i)}{q_1(t)} \quad \sigma_2^2(t) = \sum_{i=t+1}^{i} [i-\mu_2(t)]^2 \frac{P(i)}{q_2(t)}$$

$$q_1(i) = \sum_{i=1}^{i} P(i) \quad q_2(t) = \sum_{i=t+1}^{i} P(i)$$

are class probabilities and $$\mu_1(i) = \sum_{i=1}^{i} \frac{iP(i)}{q_1(t)} \quad \mu_2(t) = \sum_{i=t+1}^{i} \frac{iP(i)}{q_2(t)}$$

are class means.

P(i) is probability of intensity at level i, and I is highest intensity value of an image.

According to an exemplary embodiment, the multilevel Otsu threshold segmentation algorithm can have the following steps:
 (1) Compute histogram and probabilities of each intensity level.
 (2) Set up initial $q_i(0)$ and $\mu_i(0)$.
 (3) Step through all possible thresholds t=1, . . . I (maximum intensity).
   a) Update $q_i$ and $\mu_i$
   b) Compute $\sigma_w^2$ (t)
 (4) Find the optimized threshold t when $\sigma_w^2$ (t) reach minima.

The multilevel Otsu threshold segmentation algorithm can use this same principle to divide all pixels in an image into multiple classes. A best performed threshold can then be selected for the segmentation. A binary image of nuclei obtained via an exemplary embodiment of the multilevel Otsu threshold is shown in FIG. 3A.

II. Separate Connected Nuclei

According to various exemplary embodiments, the connected nuclei can be separated by a watershed transformation algorithm. According to various exemplary embodiments, additional auxiliary steps can be undertaken in order to separate the connected nuclei.

Watershed transformation treats the image it operates upon like a topographic map, with the brightness of each point representing its height, and finds the lines that run along the tops of ridges. There are several different algorithms known in the art to compute watersheds, e.g. watershed by flooding, watershed by topographic distance, watershed by the drop of water principle, inter-pixel watershed, topological watershed, and Meyer's flooding.

Figure 3B:
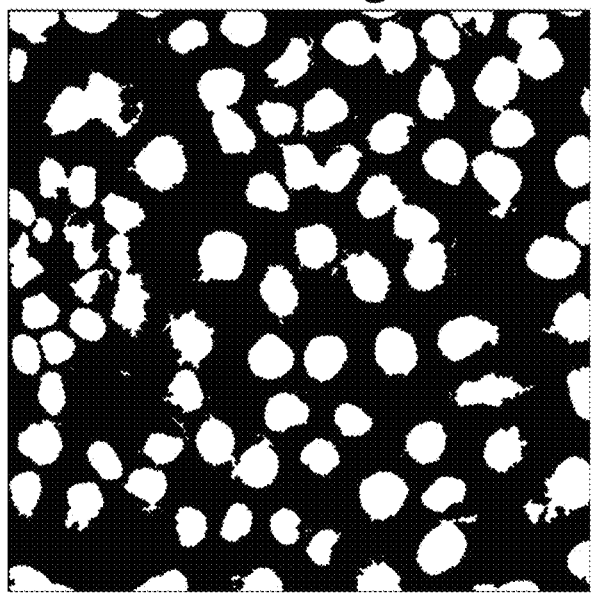

According to an exemplary embodiment, the Watershed process with auxiliary steps can include the following steps:
 (1) Slimming objects (nuclei mask). Slimming objects can slim the connections between objects and make it easier to separate the connected objects. The slimming procedure can be implemented by repeated peeling in which one pixel boundaries of the objects are peeled. The peeling steps can be conducted any number of times as necessary, for example 1, 2, 3, 4, 5, 6, 7, 8, 9, 10, 15, 20 or more times. According to the exemplary embodiment shown in FIG. 3B, the objects have been slimmed five times, and the connections between objects have been slimmed.

Figure 3C:
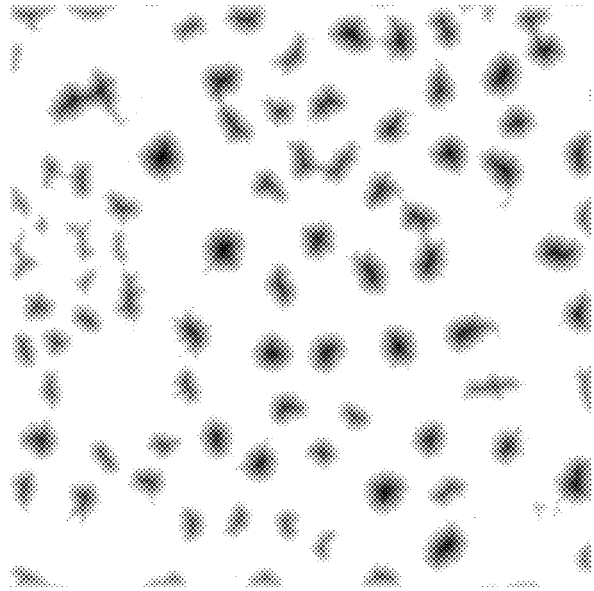

(2) Distance transformation of binary image. According to various exemplary embodiments, this step can use a Euclidean distance transform. For each background (zero) pixel in a binary image, it computes the distance between that pixel and the nearest foreground (non-zero) pixel. The output is a grey-level image, i.e., a distance map. According to an embodiment, the binary image produced and shown in FIG. 3B has been processed by a Euclidean distance transform to produce the image shown in FIG. 3C. As shown, the nuclei can be easier to separate.

(3) Watershed transformation. According to an exemplary embodiment, after obtaining the distance transformed image, watershed transformation can be applied, and the connected areas can be separated. However, applying the watershed transformation on the nuclei image may produce irregular results, as exemplified in FIG. 3D.

Figure 3D:
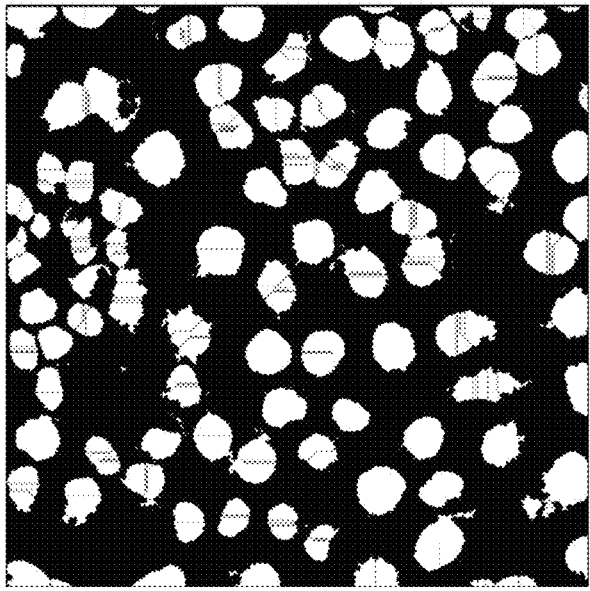

As demonstrated in FIG. 3D, a direct watershed transformation may produce over-segmented nuclei. This can occur in standard watershed segmentation because every regional minimum, even if tiny and insignificant, forms its own catchment basin.

Figure 4A:
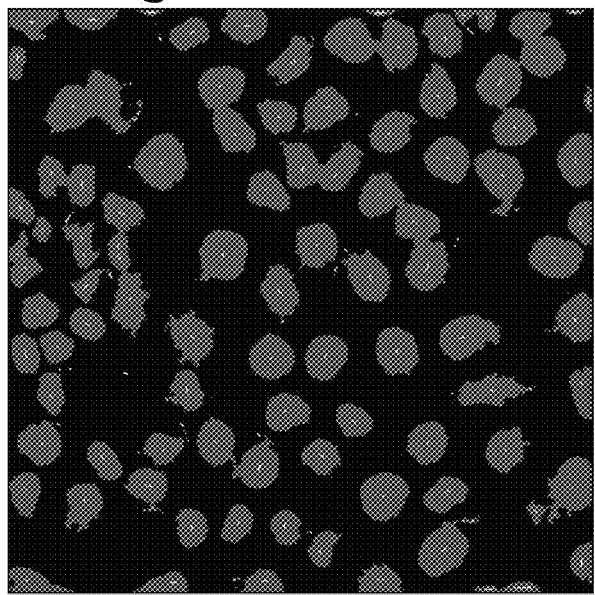
FIGS. 4A to 4D display photomicrographs of the original color image shown in FIG. 2A.
Figure 4B:
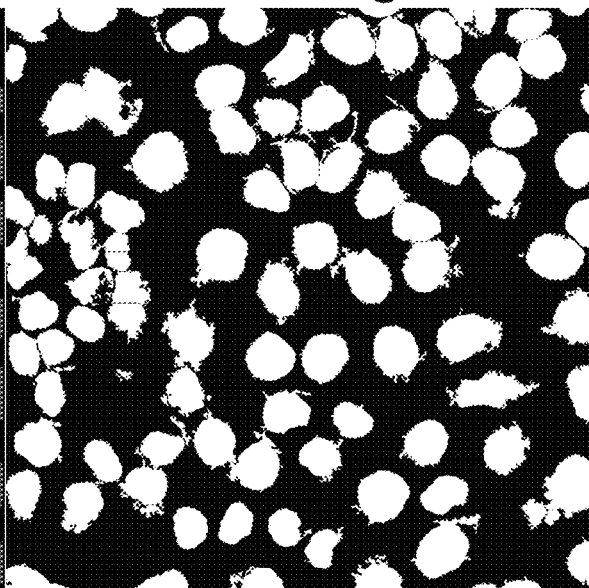

According to some exemplary embodiments, the direct watershed transformation may benefit from auxiliary methods and/or modifications. According to an exemplary embodiment, morphological erosion and dilation can be applied to improve the watershed transformation. FIG. 4B shows that nuclei can be successfully separated via the improved watershed transformation that includes these two morphological operations.

III. Draw Boundaries Between Cells

After successfully separating the nuclei, the cell boundaries may be drawn. However, as detailed above, in some instances the image may be over-segmented if the watershed transformation is used directly. According to an exemplary embodiment that can address this issue, the minima can be limited to one per object (i.e. one per nucleus). The watershed-based segmentation method can filter out tiny local minima and then modify the distance transform so that no minima occur at the filtered-out locations. FIG. 4A exemplifies a minima image after the tiny local minima have been filtered-out, overlapped with the nuclei binary image FIG. 3B. There is only one minima in every nucleus.

Figure 4C:
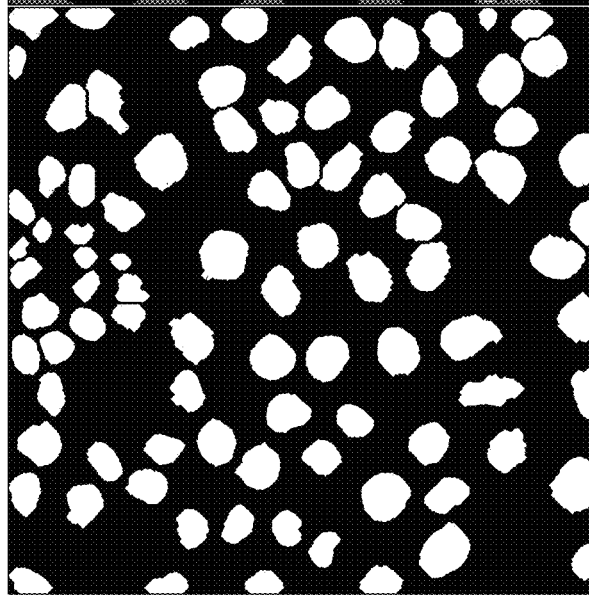

FIG. 4C is FIG. 4B after shrinking, and cells are separated further.

Figure 4D:
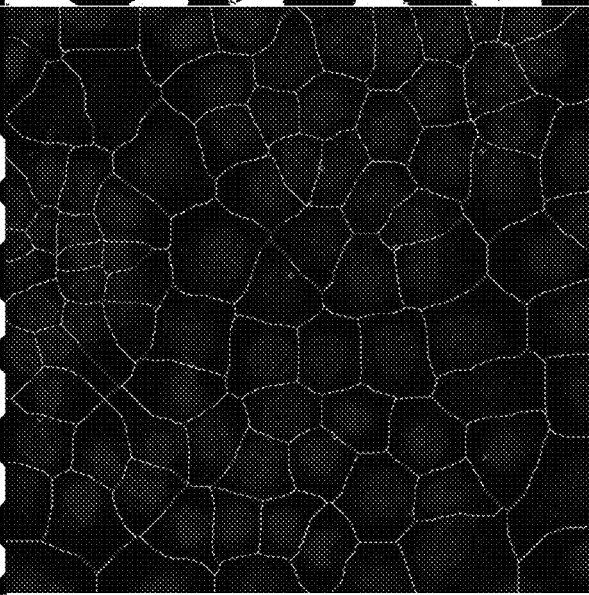

FIG. 4D shows the whole color image (FIG. 2A) with the boundaries of the separated cells. As shown in FIG. 4D, while the cells have been separated appropriately, some of the centrosomes (small red spots) may be cut by the cell boundaries. According to various exemplary embodiments, this issue can be solved.

IV. Modify Boundaries to Avoid Centrosome

According to various exemplary embodiments, the centrosomes that have been cut by the designated cell boundaries are identified. In an exemplary embodiment, this may be accomplished by segmentation, which could separate and isolate the centrosomes.

According to various exemplary embodiments, a method of improving the centrosome segmentation is presented that includes preprocessing steps. In an exemplary embodiment, the preprocessing can include denoising and/or background removal.

Figure 5A:
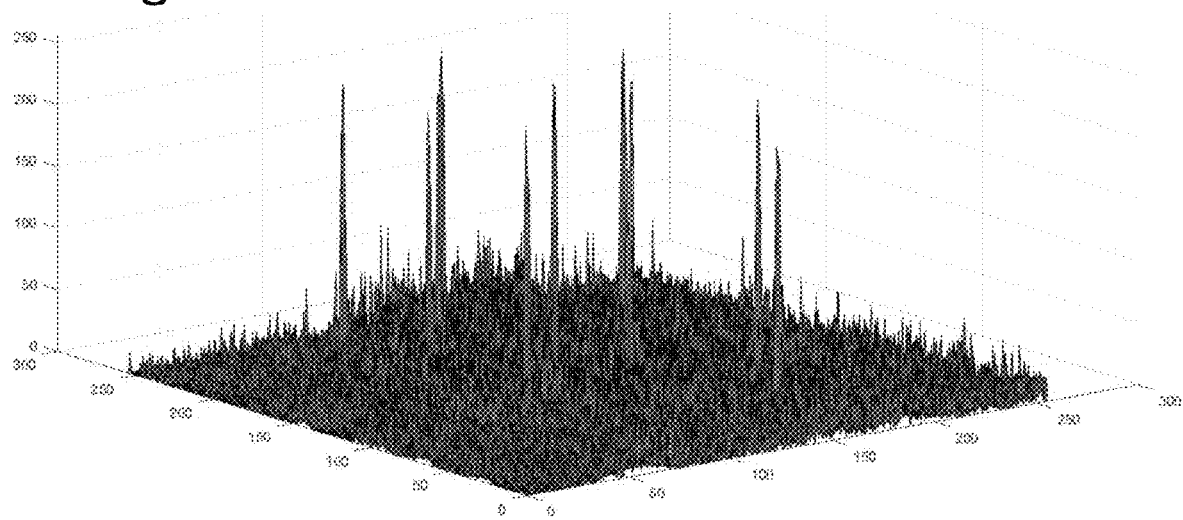
FIGS. 5A and 5B provide a three-dimensional graphical representation of the surface of a centrosome grayscale image taken from the original color image (FIG. 2A).

In an exemplary embodiment of the preprocessing, a centrosome grayscale image is produced from the original color image, exemplified in FIG. 2A. The surface of the gray image is shown in FIG. 5A, in which the tall sharp peaks are the centrosomes, accompanied by noise and uneven background. The denoising should preserve the centrosome peaks when removing the noise. In various exemplary embodiments, this can be accomplished by choosing appropriate filter(s) and parameters.

Figure 5B:
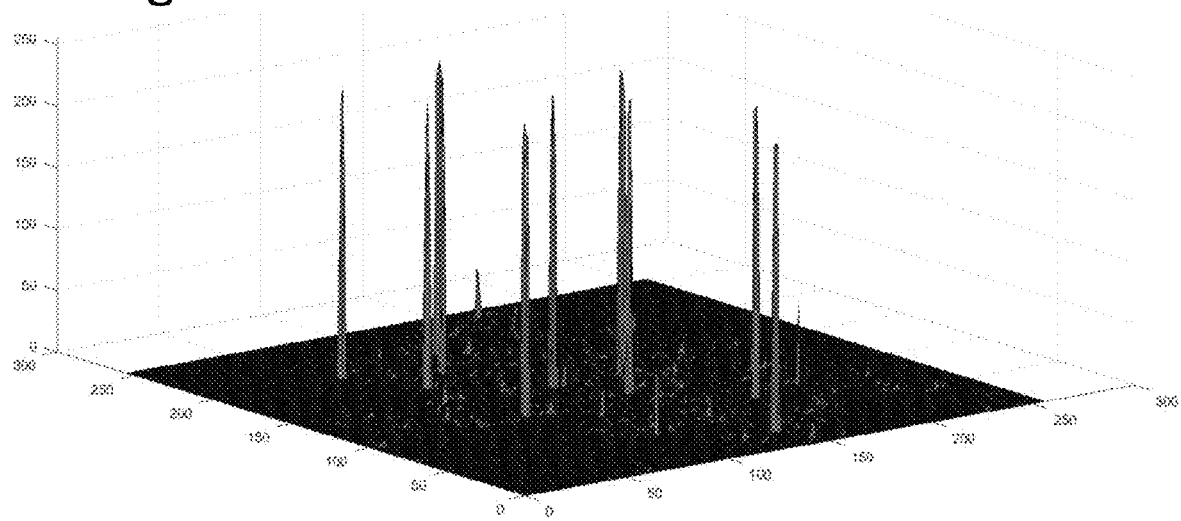

According to various exemplary embodiments, Discrete Wavelet Transform (DWT) can be applied for denoising, the uneven background can be removed via morphological operations and top-hat transformation, and an adaptive "S" enhancement can be applied to recover weakened centrosomes and further depress the noise and background. FIG. 5B shows the surface of the gray image from FIG. 5A after denoising, background removal and adaptive "S" enhancement, according to exemplary embodiments of this process. As shown in FIG. 5B, the noise is depressed, the uneven background is removed, and the centrosomes are well preserved. Following these processes, the image can become cleaner and better suited for continued processes, such as segmentation.

A. Discrete Wavelet Transform (DWT)

Figure 6:
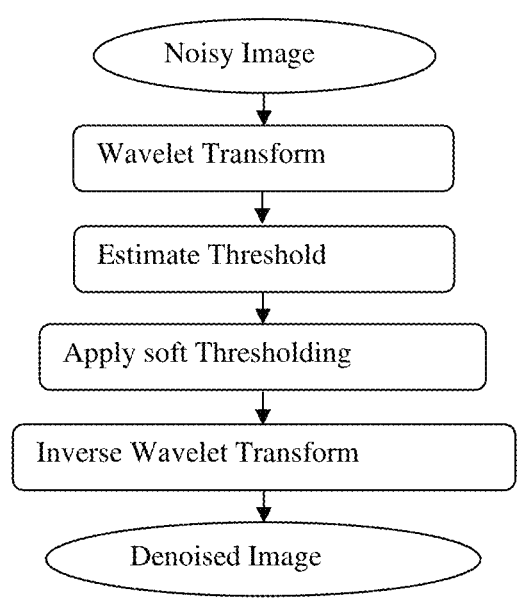
FIG. 6 is a flow chart of a method for image processing the centrosomes according to an exemplary embodiment of the present disclosure.

According to an exemplary embodiment, the wavelet denoising procedure can be as shown in FIG. 6. In an exemplary embodiment, Discrete Wavelet Transform (DWT) can be used for denoising. The signal of an image with noise can be expressed as:

$$S(k) = f(k) + \varepsilon^* e(k), k = 0, 1, 2, \ldots, n-1$$

where S(k) is the signal of image with noise, f(k) is the signal of image without noise, e(k) is noise, and ε is standard deviation of the noise.

The basic idea of DWT is that the wavelet transform leads to a sparse representation for many real-world images. This means that the wavelet transform concentrates image features in a few large-magnitude wavelet coefficients. Wavelet coefficients which are small in value are typically noise and they can be "shrunken" or removed without affecting the image quality. In an exemplary embodiment, after thresholding the wavelet coefficients, the remaining data can be reconstructed using an inverse wavelet transform to produce a denoised image.

In a more detailed exemplary embodiment, the image is first transformed into DWT domains. This step decomposes the image into four sub-band images. A low pass filter and a high pass filter are selected such that they are exactly half the frequency range between themselves (Analysis Filter Pair).

According to this exemplary embodiment, the low pass filter is first applied for each row of data, thereby getting the low frequency components of the row. Because the low pass filter is a half band filter, the output data contains frequencies only in the first half of the original frequency range. So, by Shannon's Sampling Theorem, the data can be down-sampled by two, so that the output data contains only half of the original samples. Then, the high pass filter is applied for the same row of data, and similarly the high pass components are separated, and placed by the side of the low pass components. This procedure is done for all rows.

Next, according to this exemplary embodiment, the filtering is done for each column of the intermediate data. This results in a two-dimensional array of coefficients containing four sub-bands of data, labelled as LL (low-low), HL (high-low), LH (low-high) and HH (high-high). The LL band can be decomposed once again in the same manner, thereby producing even more sub-bands. This can be done up to N levels (N=1, 2, 3 ... ). As applied in this exemplary embodiment, N=3.

A second step is to determine the threshold values for each level. If a threshold value is too small, it will pass all the noise coefficients and the resultant image will still have noise. If a threshold value is too large, it will make more of the coefficients equal to zero and the resultant image will be blurred. Therefore, the threshold value is optimized. According to various embodiments, a Universal Threshold T= $\sqrt{\sigma 2 \log M}$ can be used for selection, where $\sigma$ is the standard deviation of noise, and M is the number of pixels.

According to various exemplary embodiments, a Universal Threshold includes a hard thresholding and a soft thresholding. For a given threshold $\lambda$, and value of wavelet coefficient d, hard thresholding can be defined as:

$$D^H(d \mid \lambda) = \begin{cases} 0, & \text{for } |d| \leq \lambda \\ d, & \text{for } |d| > \lambda \end{cases}$$

and soft thresholding can be defined as:

$$D^S(d \mid \lambda) = \begin{cases} 0, & \text{for } |d| \leq \lambda \\ d - \lambda, & \text{for } d > \lambda \\ d + \lambda, & \text{for } d < -\lambda \end{cases}$$

The soft thresholding, is also called wavelet shrinkage, as values for both positive and negative coefficients are "shrinked" towards zero, and it is smoother. In contrast to soft thresholding, hard thresholding either keeps or removes values of coefficients, and so it is cruder, According to an exemplary embodiment, soft thresholding is used to get a high quality output image.

According to this exemplary embodiment, a next step is to reconstruct die filtered sub-band images. In an exemplary embodiment, this can be accomplished by using inverse DWT to produce a resulting image with the noise depressed.

B. Improved Top-Hat Transform for Background Removal

Top-hat transform is an operation that extracts small elements and details from an image. There are two types of top-hat transform: top-hat transform, which is also called white top-hat transform, and bottom-hat transform, which is also called black top-hat transform. According to various exemplary embodiments, white top-hat transform is used for background removal. The top-hat transform can be defined as:

$$T_w(I) = I - I \circ SE$$

where Tw is the white top-hat transform, I is the input image, SE is structuring element, and a denotes the opening operation.

The opening operation is defined as an erosion followed by a dilation using the same structuring element for both operations, $$I \circ SE = (I \ominus SE) \oplus SE$$

where $\ominus$ and $\oplus$ denote erosion and dilation, respectively.

Because the opening operation can remove image features smaller than the size of a structuring element SE, image regions smaller than SE size will disappear after the opening function transformation, and regions bigger than the SE will be saved. Therefore, the use of top-hat transform can output a uniform brightness image (background) if a large scale SE is used on the image for an opening operation.

However, because the opening operation may generate new fake contours when the structuring element is increased, edge noise may be introduced with opening based top-hat transform, which can result in a block effect. According to various exemplary embodiments, an improved top-hat transform can utilize a morphological opening by reconstruction, which is a filter that can satisfy the requirement of preserving edge information and introducing no fake contours, and at the same time considers both shape and size features.

In an exemplary embodiment, the improved top-hat transform can be used for removing background. According to this embodiment, reconstruction involves two images and a structuring element. One image is the marker, which is the starting point for the transformation. The other image is the mask, which constrains the transformation. The structuring element is used to define connectivity. If G is the mask and F is the marker, the reconstruction of G from F, denoted RG(F), can be defined by the following interactive procedure:

1) Initialize $h_1$ to be the marker image, F
2) Create the structuring element, for example: SE=ones (3) (3×3 matrix of 1 s)
3) Repeat: $h_{k+1} = (h_k \oplus SE) \cap G$ until $h_{k+1} = h_k$
4) $R_G(F) = h_k$ marker F must be a subset of G: F⊇G.

Opening by reconstruction can restore the original shapes of the objects that remain after erosion. The opening by reconstruction of an image G using structuring element SE, can be defined as $R_G$ (G⊖SE).

According to various exemplary embodiments, during denoising, the pixels in an image far from the nuclei are set to zero. This procedure is called background cleaning and can help to clean some noise. Some noises are even stronger than the centrosomes are cleaned.

Figure 7A:
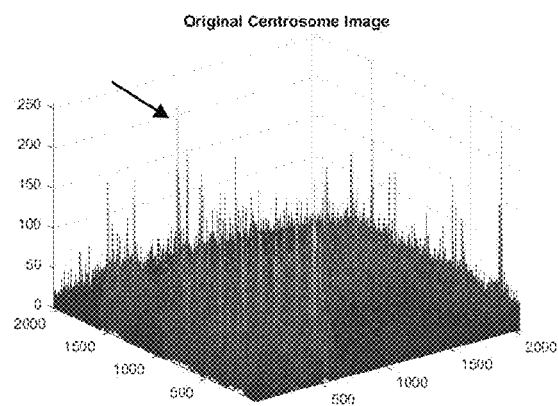
FIGS. 7A and 7B provide a three-dimensional graphical representation of the surface of a centrosome image.
Figure 7B:
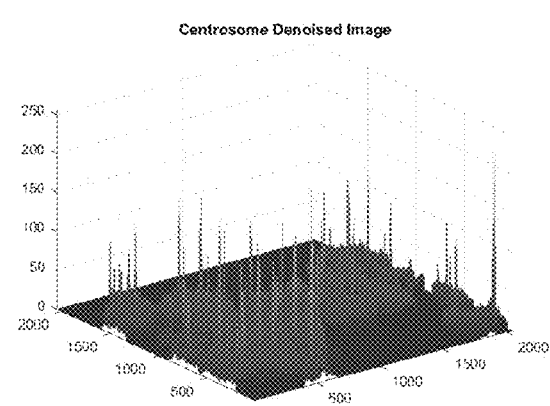

FIG. 7A shows the surface of a centrosome image before background cleaning. The peak identified by the arrow is a noise signal that is stronger than some centrosome signals. FIG. 7B shows the surface of the centrosome image after the background cleaning, in which the strong noise signal has been removed.

Figure 8A:
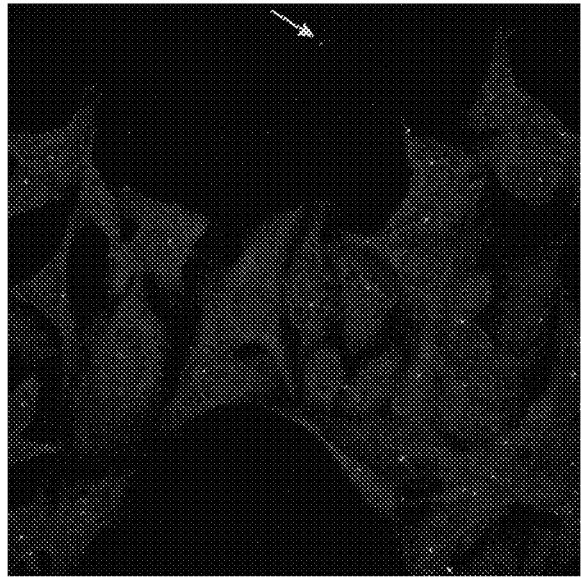
FIGS. 8A and 8B display photomicrographs of a centrosome image, after undergoing centrosome image processing steps according to an exemplary embodiment of the present disclosure.
Figure 8B:
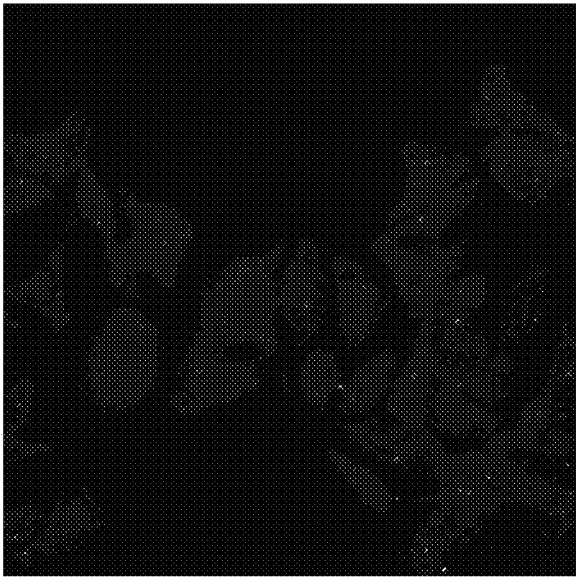

The image in FIG. 8A shows the centrosome image before background cleaning, the white spot identified by the arrow is the strong noise signal. The image in FIG. 8B is the centrosome image after background cleaning, where the strong noise signal has been cleaned.

C. Adaptive Enhancement of Centrosome

According to various exemplary embodiments, after denoising and background removal, the frame images can become very clean, but the centrosome signal may also be weakened at the same time. This may degrade the performance of the segmentation steps, perhaps causing centrosomes to be missed. To recover a potentially weakened centrosome, an adaptive enhancement with Contrast-Stretching Transformations ("S enhancement") can be utilized in various exemplary embodiments.

$$J = 1./(1 + (m./(\text{double}(I) + eps)).\hat{\ }E)$$

where I is input image, J is output image, and m is a constant, the point to separate the bright and dark. E is an exponential number, which controls the changing rate of the function. The eps is a small constant, $2\hat{\ }-52$. According to various embodiments, E can equal any number greater than zero, for instance 1, 2, 3, 4, 5, 6, 7, 8, 9, 10.

Figure 9:
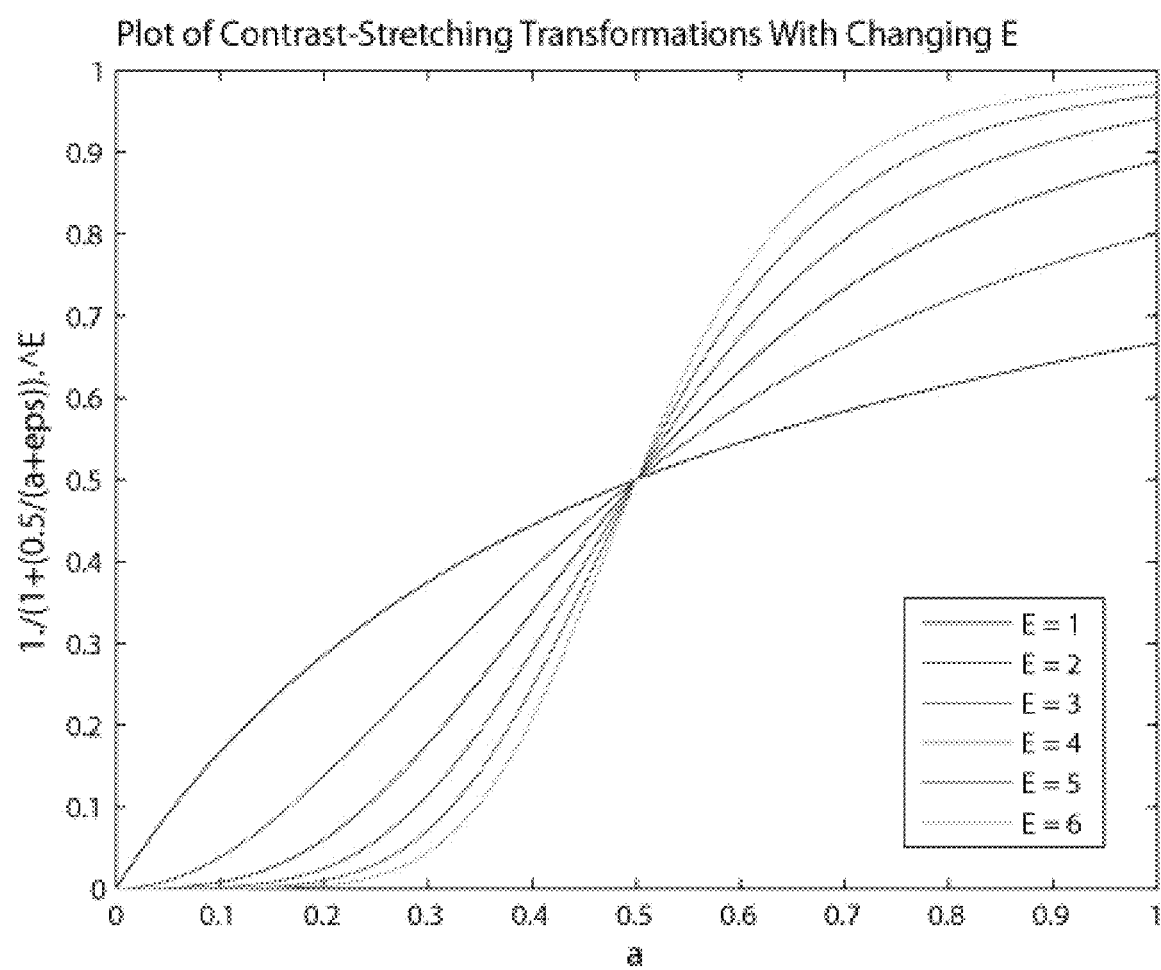
FIG. 9 is a graph illustrating a plot of contrast-stretching transformations at various values for E. Contrast-Stretching Transformation (CST) can be used to strengthen the centrosome signal in centrosome processing steps according to an exemplary embodiment of the present disclosure. Because of the plot "S" shape, the CST may be referred to as "S-enhancement".

FIG. 9 illustrates several Contrast-Stretching Transformation curves with different E values, and m=0.5. According to an exemplary embodiment, m=0.5, E=4.

According to various exemplary embodiments, the image can be checked after denoising and background removal. If the strong signal intensities of the centrosomes are lower than a certain level, this may mean that the centrosomes have been weakened too much for segmentation. In this case, the S enhancement can be applied. The S enhancement can make bright pixels brighter and dark pixels darker, which selectively enhances the centrosomes. The S enhancement can also further depress any remaining noise and background, therefore further cleaning the image when recovering the weakened centrosomes.

D. Find Centrosomes on the Boundaries

Figure 10:
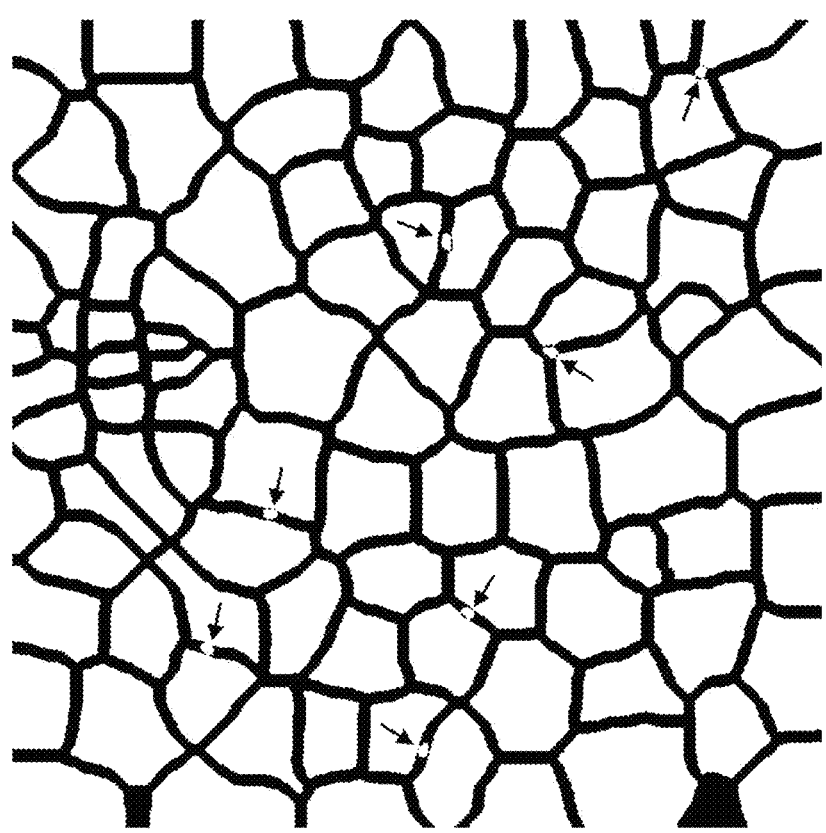
FIG. 10 illustrates the segmented centrosome image, with thickened boundary lines. The image can be used as a mask to determine if centrosomes fall on the boundaries.

According to various exemplary embodiments, after the above detailed preprocessing, the centrosome image can be segmented to acquire all the centrosomes. In an exemplary embodiment, a thickened boundary image is used as a mask to determine if any centrosomes fall on the cell boundaries. As illustrated in FIG. 10, several centrosomes (white dots) may fall on the boundaries, as pointed out by the arrows.

According to various exemplary embodiments, the boundary can be revised, and a new boundary can be created that avoid the centrosome. In an exemplary embodiment, this process can have the following steps.

Figure 12A:
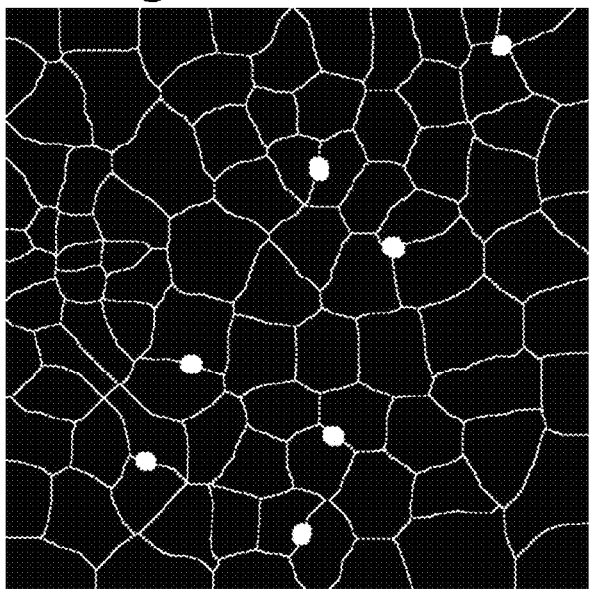
FIGS. 12A to 12D display photomicrographs of the color image shown in FIG. 2A, after undergoing image processing steps according to an exemplary embodiment of the present disclosure.
Figure 12B:
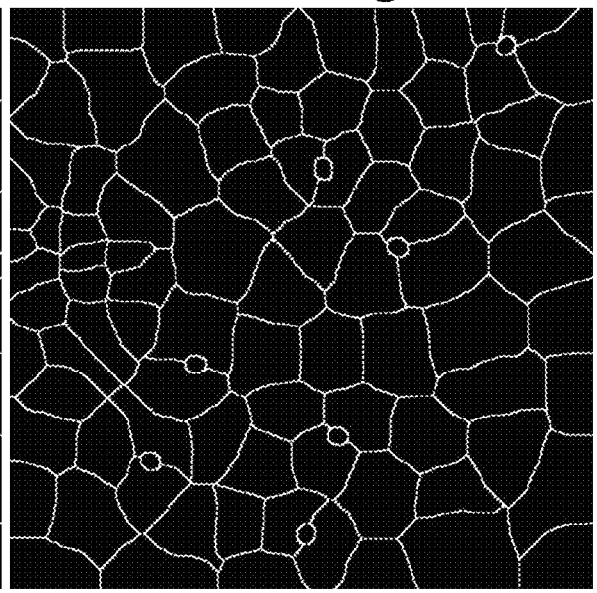

1) Create centrosome areas that may include centrosomes on the boundaries. First, dilate segmented centrosomes positioned on boundaries to form centrosome masks, which include centrosomes but bigger than centrosomes, as shown for example in FIG. 12A. Then, interior pixels of these masks can be removed to create boundaries, as shown for example in FIG. 12B.

2) Merge centrosome areas with the closest cell area, and form new boundaries that avoid the centrosomes. According to an exemplary embodiment, distances are calculated of every centrosome centroid to all its neighbor cell centroids, and the closest cell area with shortest distance is determined. In an exemplary embodiment, this procedure can be the following:

Suppose the centroid coordinate of the centrosome is $x_0$ and $y_0$, the centroid coordinates of all cells (N) are $x_i$ and $y_i$, i=1, 2, 3 . . . , N. Then the shortest distance is $$D = \text{Min} \begin{cases} \sqrt{(x_1 + x_0)^2 + (y_1 - y_0)^2} \\ \sqrt{(x_2 - x_0)^2 + (y_2 - y_0)^2} \\ \sqrt{(x_N + x_0)^2 + (y_N - y_0)^2} \end{cases}$$

Figure 11:
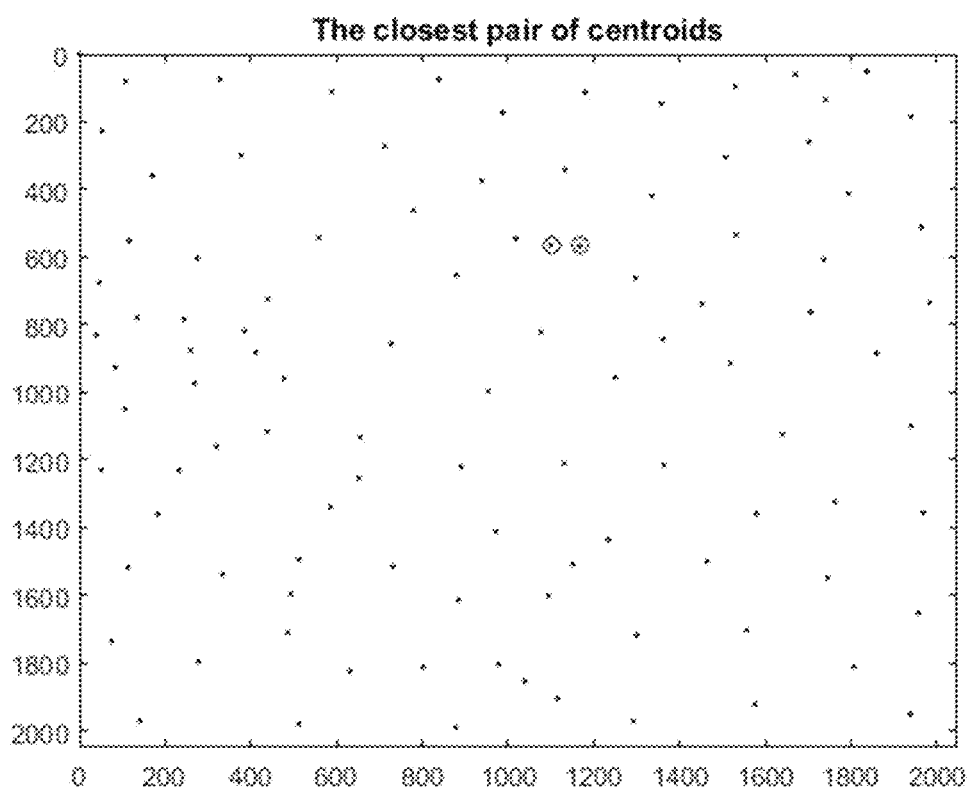
FIG. 11 illustrates a feature of the image processing steps to modify cell boundaries to avoid centrosomes from cell boundaries, according to an exemplary embodiment of the present disclosure. The processing steps calculate the distances of every centrosome centroid to all of its neighbor cell centroids, and finds the closest cell area with the shortest distance. The dots in FIG. 11 are centroids of separated areas, which include only one centrosome area and all cell areas. The two circled dots are the centroid of a centrosome area and the centroid of a closest cell area.

Illustrated in FIG. 11, the dots represent centroids of separated areas, which include one centrosome area and all cells' areas. The two circled dots are the centroid of a centrosome area and the centroid of the closest cell area. The centrosome area is then merged with the cell area with the shortest distance to form a new area.

$$\text{Area}_{new} = \text{Area}_{cell} \cup \text{Area}_{centrosome}$$

This procedure is repeated until all centrosomes falling on boundaries are merged into a closest cell area.

Figure 12C:
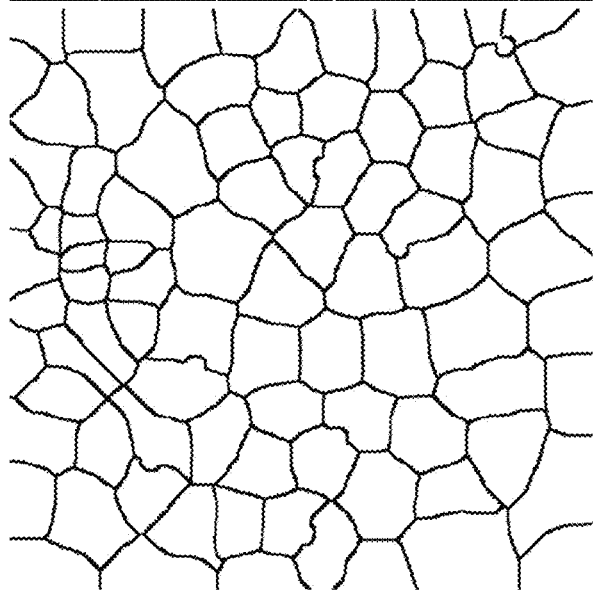

According to various exemplary embodiments, new boundaries can be formed like those shown in FIG. 12C.

Figure 12D:
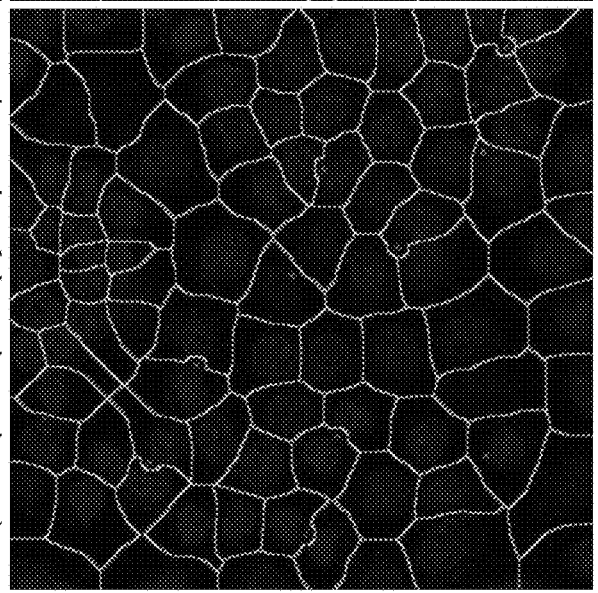

Finally, according to various exemplary embodiments, the new boundaries are added into the color image (FIG. 2A), as shown in FIG. 12D. The new boundaries avoid the centrosomes.

V. Get all ROIs from Cell Separated Image

Figure 13A:
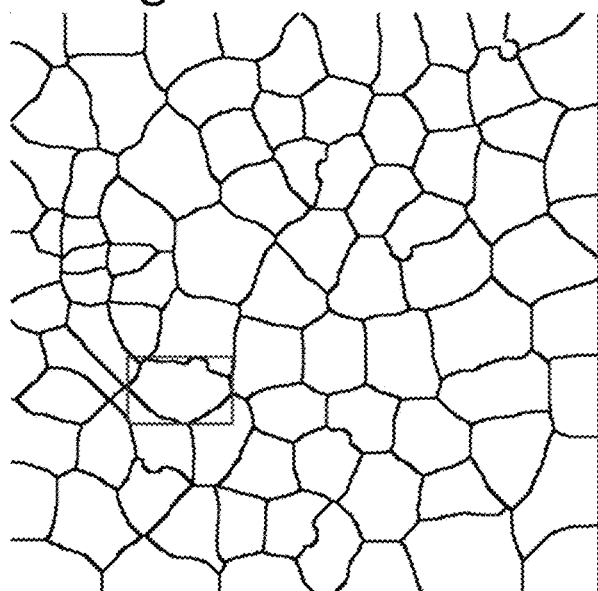
FIGS. 13A and 13B display photomicrographs of the color image shown in FIG. 2A, after undergoing image processing steps according to an exemplary embodiment of the present disclosure, in which the frame image is divided into smaller images, each encompassing a single cell.
Figure 13B:
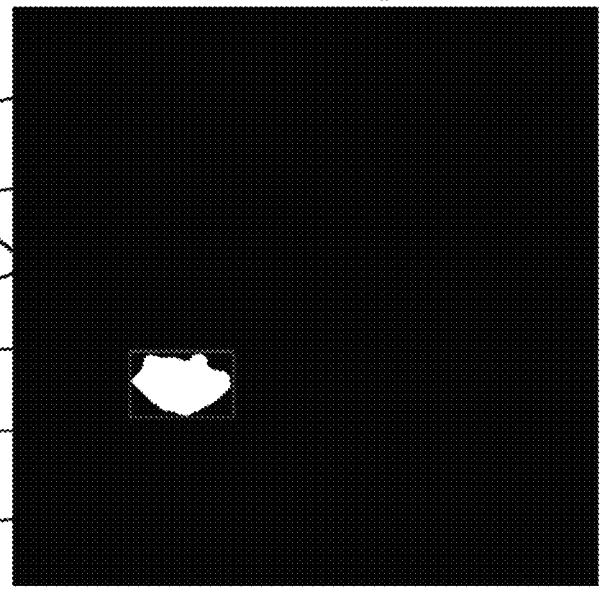

According to various exemplary embodiments, after cells and centrosomes have been separated, as shown for example in FIG. 12D, each ROI can be cropped one by one. In an exemplary embodiment, first a bounding-box is obtained from the cell area mask image, as shown in FIG. 13A. However, as illustrated, the bounding-box may include portions of other cells, which will affect processing. To exclude these parts of other cells, according to an exemplary embodiment, only one cell mask is turned on (i.e., its pixel value set to one) and all other cell masks are turned off (i.e., their pixel values set to zero), as shown in FIG. 13B.

Figure 14A:
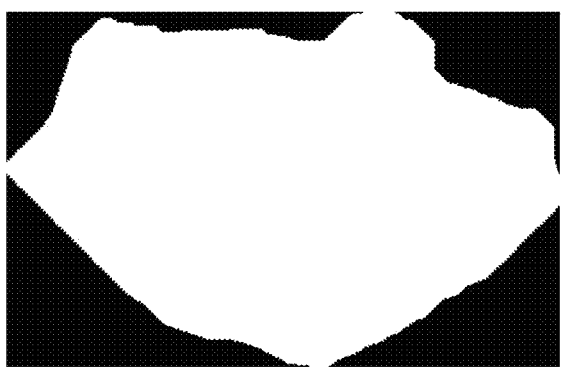
FIGS. 14A to 14E display photomicrographs of the original color images shown in FIG. 2A, after undergoing image processing steps according to an exemplary embodiment of the present disclosure, in which the ROI is defined by a single cell and the centrosomes that belong to that cell.
Figure 14B:
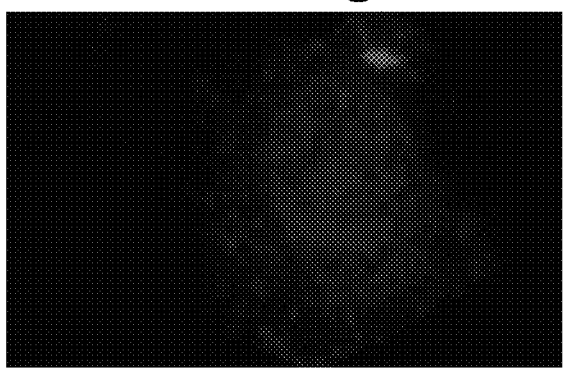
Figure 14C:
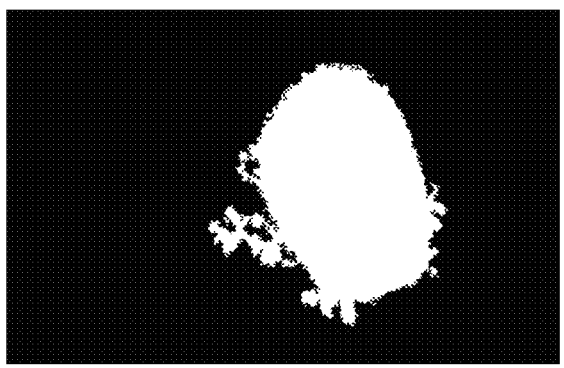
Figure 14D:
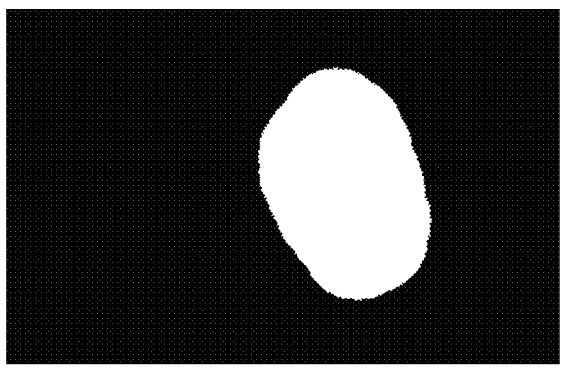
Figure 14E:
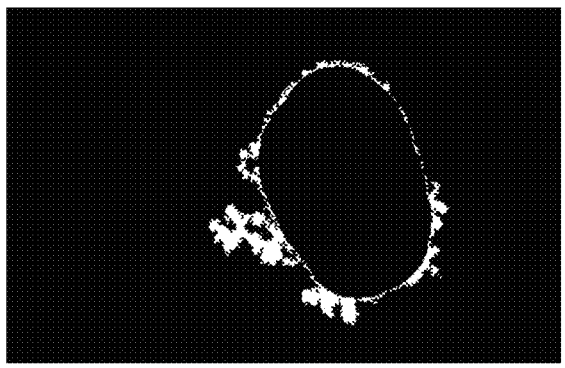
Figure 14F:
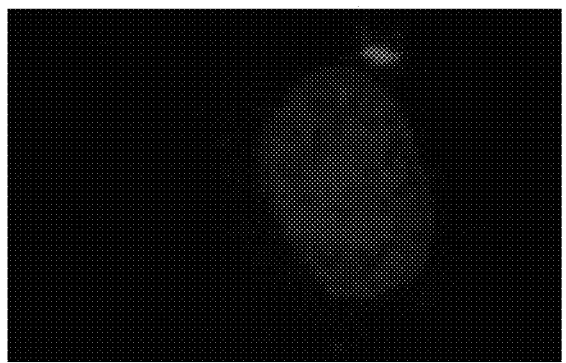
FIG. 14F shows the final output ROI image.

According to an exemplary embodiment, the bounding-box can be a circumscribed rectangle of a cell area, and the coordinates of the top-left corner of the rectangle can be obtained, along with its width and length. The ROI mask image can then be cut off based on the bounding-box, like that shown in FIG. 14A. Then the ROI image can be cut off based on the ROI mask, like that shown in FIG. 14B. Next, the nucleus can be segmented to obtain the nucleus' mask, like that shown in FIG. 14C, followed by cleaning the nucleus' mask to obtain a cleaned mask, like that shown in FIG. 14D. Shown in FIG. 14E is the difference between before cleaning (FIG. 14C) and after cleaning (FIG. 14D). Finally, an ROI image like that shown in FIG. 14F is obtained and output. This procedure can be repeated until all ROI are obtained.

EXAMPLE

An automated ROI selection system according to an embodiment of the present disclosure was tested on a database of fifteen (15) frame images, which included more than 700 cells. More than 97% of the cells were correctly selected as a ROI.

Figure 15:
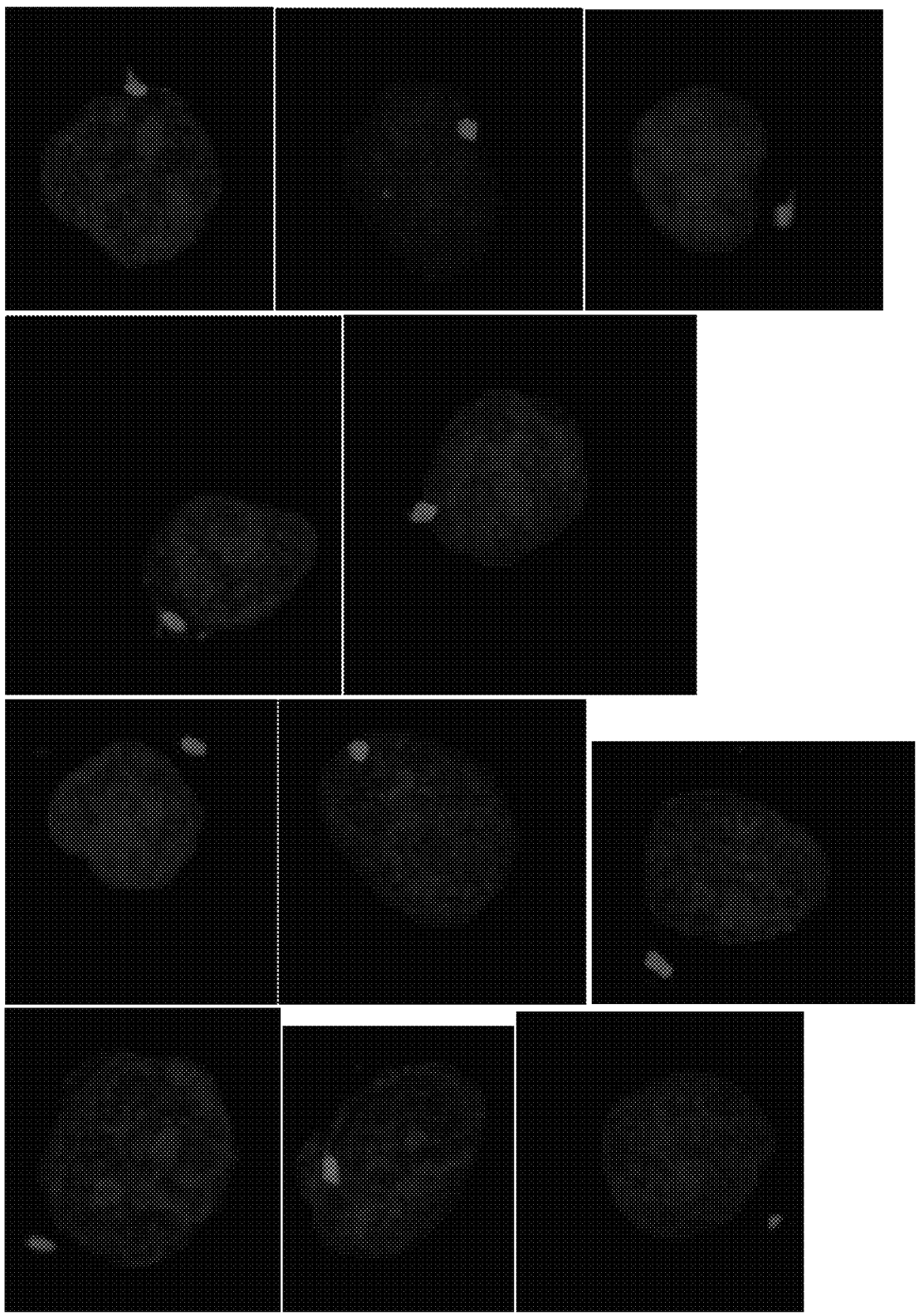
FIG. 15 displays several photomicrographs of individual cells selected as individual ROIs from the original color image of FIG. 2A, after undergoing processing steps according to an exemplary embodiment of the present disclosure. Each photomicrograph shows a single nucleus (blue) and centrosome(s) (red).

FIG. 15 shows several ROI images that were selected from the processed frame image of FIG. 12D.

What is claimed is:
1. A method for producing a region of interest (ROI) in an image of a biological sample comprising cells, the method comprising:
  obtaining an image of the biological sample, the sample comprising cells that have been treated to visualize the cells' nuclei and centrosomes;
  segmenting and separating the cell nuclei;
  segmenting the centrosomes;
  separating the cells with cell boundaries;

determining whether a centrosome lies on a cell boundary, and based on a centrosome that lies on a cell boundary, then correcting the cell boundary so that the centrosome lies within the cell boundary; and creating a ROI that include only one cell and its centromeres;

wherein the ROI is fully-automatically selected by using a computer algorithm.

2. The method of claim 1, further comprising outputting the ROI as an image.

3. The method of claim 1, wherein the biological sample comprises cancer cells.

4. The method of claim 1, wherein the image is a color frame image.

5. The method of claim 1, further comprising denoising and removing background from the centrosomes.

6. The method of claim 1, wherein segmenting and separating the cell nuclei comprises:

obtaining a grayscale image of the biological sample;
applying a gradient magnitude segmentation operation;
applying morphological erosion and dilation operations; and
applying a multilevel Otsu threshold operation to obtain a binary image.

7. The method of claim 6, further comprising:

applying a slimming operation to the binary image that comprises peeling pixel boundaries from the nuclei;
applying a distance transformation to the binary image to produce a gray-level image; and
applying a watershed transformation to the gray-level image.

8. The method of claim 7, further comprising applying morphological erosion and dilation operations before applying the watershed transformation.

9. The method of claim 7, wherein the watershed transformation further comprises:

filtering out tiny local minima and modifying the distance transform so that no minima occur at the filtered-out locations and so that there are only one minima in every nucleus; and
segmenting the cells with cell boundaries.

10. The method of claim 1, wherein determining whether a centrosome lies on a cell boundary comprises segmenting the centrosomes, wherein the segmenting comprises:

obtaining a grayscale centrosome image from the image of the biological sample;
applying discrete wavelet transform to denoise the centrosome image;
applying a top-hat transform to remove background; and
applying a contrast-stretching transformation to strengthen the centrosome signal.

11. The method of claim 1, wherein correcting the cell boundary comprises:

segmenting the centrosomes;
dilating the segmented chromosomes positioned on the cell boundaries to form centrosome masks;
removing interior pixels on the masks to create centrosome boundaries;
calculating distances of the centrosome centroid to all its neighbor cell centroids, and determining the closest cell area having the shortest distance; and
merging the centrosome areas with the closest cell area to form new cell boundaries that incorporate the centrosome within the new cell boundary.

12. The method of claim 1, wherein creating the ROI comprises:

obtaining a bounding-box encompassing a single cell; and
processing the bounding-box to exclude parts of other cells that do not include the single cell.

13. The method of claim 12, wherein processing the bounding-box comprises:

obtaining the bounding-box from a cell area mask image;
turning on one cell mask defined by a boundary of the single cell, and turning off all other cell masks; and
cutting off the remaining mask image to create the ROI.

14. The method of claim 13, further comprising segmenting the nucleus within the ROI to obtain the nucleus' mask, and obtaining an ROI image.

15. A non-transitory computer-readable medium having computer-readable instructions embodied thereon for performing a method for producing a region of interest (ROI) in an image of a biological sample comprising cells, the method comprising:

receiving an image of the biological sample, the sample comprising cells that have been treated to visualize the cells' nuclei and centrosomes;
segmenting and separating the cell nuclei;
segmenting the centrosomes;
separating the cells with cell boundaries;
determining whether a centrosome lies on a cell boundary, and based on a centrosome that lies on a cell boundary, then correcting the cell boundary so that the centrosome lies within the cell boundary; and
creating a ROI that includes only one cell and its centromeres;
wherein the ROI is fully-automatically selected by using a computer algorithm.

16. An apparatus for producing a region of interest (ROI) in an image of a biological sample comprising cells, the apparatus comprising:

memory storing image data of the biological sample; and
at least one processor communicating with the memory and analyzing the image data, the processor configured to:
segment and separate the cell nuclei;
segment the centrosomes;
separate the cells with cell boundaries;
determine whether a centrosome lies on a cell boundary, and based on a centrosome that lies on a cell boundary, then correcting the cell boundary so that the centrosome lies within the cell boundary; and
create a ROI that includes only one cell and its centromeres;
wherein the ROI is fully-automatically selected by using a computer algorithm.

* * * * *